US008777277B2

(12) United States Patent
Dole et al.

(10) Patent No.: US 8,777,277 B2
(45) Date of Patent: Jul. 15, 2014

(54) PIPE ELEMENT HAVING SHOULDER, GROOVE AND BEAD AND METHODS AND APPARATUS FOR MANUFACTURE THEREOF

(75) Inventors: Douglas R. Dole, Whitehouse Station, NJ (US); Charles E. Wilk, Jr., Slatington, PA (US); Scott D. Madara, Nazareth, PA (US); Anthony J. Cuvo, Coopersburg, PA (US)

(73) Assignee: Victaulic Company, Easton, PA (US)

( * ) Notice: Subject to any disclaimer, the term of this patent is extended or adjusted under 35 U.S.C. 154(b) by 50 days.

(21) Appl. No.: 13/307,404

(22) Filed: Nov. 30, 2011

(65) Prior Publication Data
US 2012/0139236 A1 Jun. 7, 2012

Related U.S. Application Data

(60) Provisional application No. 61/530,771, filed on Sep. 2, 2011, provisional application No. 61/418,967, filed on Dec. 2, 2010.

(51) Int. Cl.
*F16L 23/00* (2006.01)

(52) U.S. Cl.
USPC ......................... 285/367; 285/365

(58) Field of Classification Search
USPC ......... 285/363, 364, 365, 366, 367, 410, 411, 285/409, 408, 407, 406
See application file for complete search history.

(56) References Cited

U.S. PATENT DOCUMENTS

| 40,967 | A | | 12/1863 | Vanguysling | |
|---|---|---|---|---|---|
| 411,130 | A | * | 9/1889 | Robinson | ..................... 285/409 |
| 433,271 | A | | 7/1890 | Chamberlain | |
| 514,588 | A | | 2/1894 | Coles | |
| 818,843 | A | | 4/1906 | McCormick | |
| 856,896 | A | | 6/1907 | McCormick | |
| 1,472,047 | A | | 5/1922 | Carlson | |
| 1,582,525 | A | | 4/1926 | Lucas | |

(Continued)

FOREIGN PATENT DOCUMENTS

| EP | 0432485 B1 | 6/1994 |
|---|---|---|
| JP | 55-036071 | 3/1980 |

(Continued)

OTHER PUBLICATIONS

Copenheaver, Blaine R.; PCT International Search Report and Written Opinion regarding International Application No. PCT/US2012/052793, Nov. 6, 2012.

(Continued)

*Primary Examiner* — David E Bochna
(74) *Attorney, Agent, or Firm* — Ballard Spahr LLP

(57) ABSTRACT

A pipe element has a circumferential shoulder at one end. The shoulder has an outer diameter greater than the outer diameter of the pipe element. A groove is positioned adjacent to the shoulder. The groove has a floor surface with an outer diameter less than the outer diameter of the pipe element. A bead is positioned contiguous with the groove. The bead has an apex with an outer diameter greater than the outer diameter of the pipe element. A combination of roller tools is used to cold work pipe elements and impart a desired shape to the sidewall in one method of manufacture. In another method, a spin forming tool is revolved in an orbit of increasing diameter within the pipe element captured within a die.

19 Claims, 15 Drawing Sheets

(56) References Cited

U.S. PATENT DOCUMENTS

| | | | |
|---|---|---|---|
| 2,355,852 A | | 4/1944 | Fisher |
| 2,777,715 A | * | 1/1957 | Beyer ............................ 285/363 |
| 2,933,124 A | | 4/1960 | Benson et al. |
| 3,122,830 A | | 3/1964 | Dawson et al. |
| 3,290,914 A | | 12/1966 | Vaill et al. |
| 3,311,971 A | | 4/1967 | Hicks et al. |
| 3,364,709 A | | 1/1968 | Scann |
| 3,382,693 A | | 5/1968 | Rozhdestvensky et al. |
| 3,403,931 A | * | 10/1968 | Crain et al. .................... 285/367 |
| 3,648,500 A | | 3/1972 | Vaill |
| 3,680,341 A | | 8/1972 | Finn, Jr. |
| 3,724,878 A | * | 4/1973 | Ford .............................. 285/367 |
| 3,738,139 A | | 6/1973 | Proops et al. |
| 3,787,945 A | | 1/1974 | Pasek et al. |
| 3,906,771 A | | 9/1975 | Martin |
| 4,102,168 A | | 7/1978 | Brookes et al. |
| 4,134,286 A | | 1/1979 | Martin |
| 4,143,535 A | | 3/1979 | Bouman |
| 4,311,248 A | | 1/1982 | Westerlund et al. |
| 4,319,472 A | | 3/1982 | Martin |
| 4,413,395 A | | 11/1983 | Garnier |
| 4,522,433 A | | 6/1985 | Valentine et al. |
| 4,527,818 A | * | 7/1985 | Rundell ......................... 285/367 |
| 4,615,198 A | | 10/1986 | Hawkins et al. |
| 4,646,548 A | | 3/1987 | Zimmerli et al. |
| 4,706,355 A | | 11/1987 | Kuhns et al. |
| 4,716,752 A | | 1/1988 | Diller |
| 4,730,850 A | * | 3/1988 | Takahashi .................... 285/409 |
| 4,796,457 A | | 1/1989 | Iijima |
| 4,845,972 A | | 7/1989 | Takeuchi et al. |
| 4,942,751 A | | 7/1990 | Fuchs, Jr. |
| 5,080,400 A | | 1/1992 | Adamek |
| 5,184,495 A | | 2/1993 | Chunn et al. |
| 5,209,527 A | | 5/1993 | Hohmann et al. |
| 5,327,756 A | | 7/1994 | Fox |
| 5,450,738 A | | 9/1995 | Chatterley et al. |
| 5,531,370 A | | 7/1996 | Rohrberg |
| 5,564,184 A | | 10/1996 | Dinh |
| 5,570,603 A | | 11/1996 | Chatterley et al. |
| RE35,533 E | * | 6/1997 | Adamek et al. ............... 285/367 |
| 5,826,920 A | | 10/1998 | Bartholomew |
| 5,904,063 A | | 5/1999 | Owens |
| 5,956,988 A | | 9/1999 | Beste et al. |
| 6,032,502 A | | 3/2000 | Halasz et al. |
| 6,196,039 B1 | | 3/2001 | Williams et al. |
| 6,233,991 B1 | | 5/2001 | Thimmel et al. |
| 6,324,883 B1 | | 12/2001 | Rennehvammen |
| 6,708,548 B2 | | 3/2004 | Ehrke et al. |
| 6,726,254 B2 | * | 4/2004 | Feichtinger .................. 285/364 |
| 6,843,096 B2 | | 1/2005 | Viegener et al. |
| 6,959,576 B2 | | 11/2005 | Hastings et al. |
| 7,114,358 B2 | | 10/2006 | Lamb |
| 7,174,759 B2 | | 2/2007 | Massee |
| 7,216,521 B2 | | 5/2007 | Ogawa |
| 7,225,660 B1 | | 6/2007 | Ledebur |
| 7,251,974 B2 | | 8/2007 | Massee |
| 7,316,142 B2 | | 1/2008 | Lancaster |
| 7,341,287 B2 | | 3/2008 | Gibb et al. |
| 7,364,206 B2 | | 4/2008 | Romanelli et al. |
| 7,415,765 B2 | | 8/2008 | Ozawa |
| 7,490,499 B2 | | 2/2009 | Suzuki et al. |
| 7,506,897 B2 | | 3/2009 | Bauer |
| 7,712,796 B2 | * | 5/2010 | Gibb et al. .................... 285/367 |
| 7,931,310 B2 | * | 4/2011 | Lake ............................. 285/365 |
| 7,967,031 B2 | | 6/2011 | Esser |
| 8,020,898 B2 | * | 9/2011 | Ignaczak ...................... 285/367 |
| 8,033,579 B2 | * | 10/2011 | Takeda et al. ................ 285/367 |
| 8,246,709 B2 | * | 8/2012 | Franken ....................... 285/407 |
| 2002/0108426 A1 | | 8/2002 | Roe et al. |
| 2003/0038481 A1 | | 2/2003 | Viegener |
| 2005/0167977 A1 | | 8/2005 | Ozawa |
| 2005/0212284 A1 | | 9/2005 | Dole |
| 2007/0090645 A1 | * | 4/2007 | Fadini et al. ................. 285/364 |
| 2007/0204666 A1 | | 9/2007 | Suzuki et al. |
| 2009/0189391 A1 | | 7/2009 | Ferlin et al. |
| 2010/0140920 A1 | | 6/2010 | Kloss et al. |

FOREIGN PATENT DOCUMENTS

| | | |
|---|---|---|
| JP | 61-186135 | 8/1986 |
| JP | 62-3590 | 1/1987 |
| JP | 02-12382 | 4/1990 |
| JP | 3018876 | 9/1995 |
| JP | 09-053772 | 2/1997 |
| JP | 09-152068 | 10/1997 |
| JP | 2003-340539 | 2/2003 |
| JP | 2005-061275 | 10/2005 |
| JP | 2009-222107 | 10/2009 |
| RU | 1787625 A1 | 1/1993 |
| SU | 445496 | 10/1974 |
| SU | 730420 | 4/1980 |

OTHER PUBLICATIONS

Author Unknown; Tube End Forming Process (20 degree big bead); Online Video; Proto1 Manufacturing; Mar. 9, 2009; Retrieved from internet URL: http://www.youtube.com/watch?feature=player_embedded&v=StN0S4W-mw>.

(Copenheaver, Blaine R.) PCT International Search Report and Written Opinion regarding International Application No. PCT/US2011/062563, May 30, 2012.

* cited by examiner

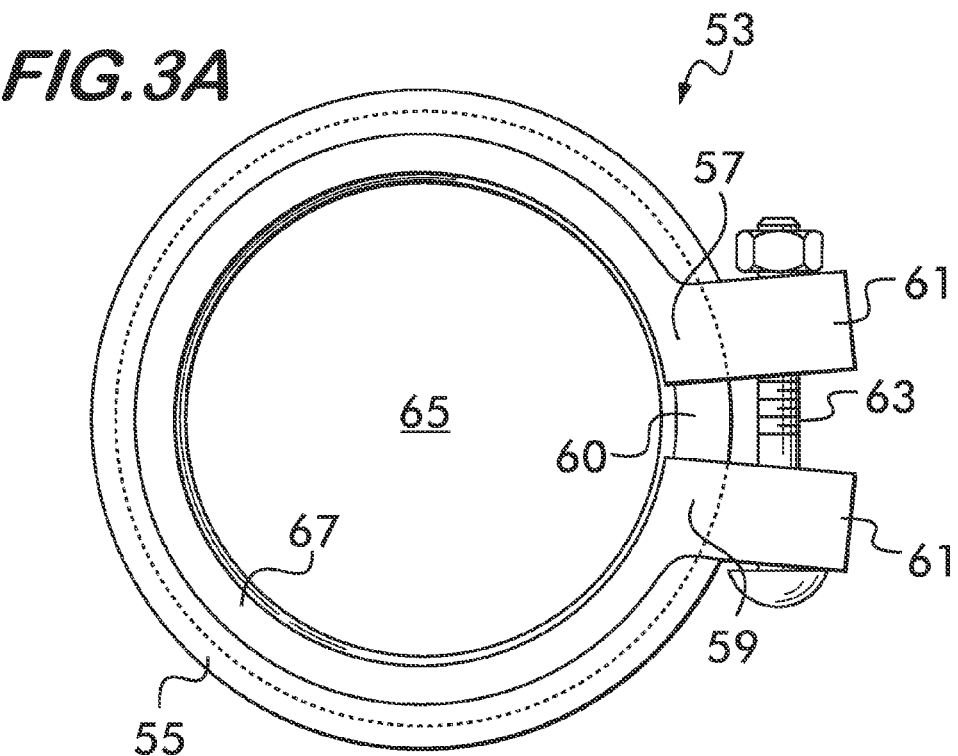
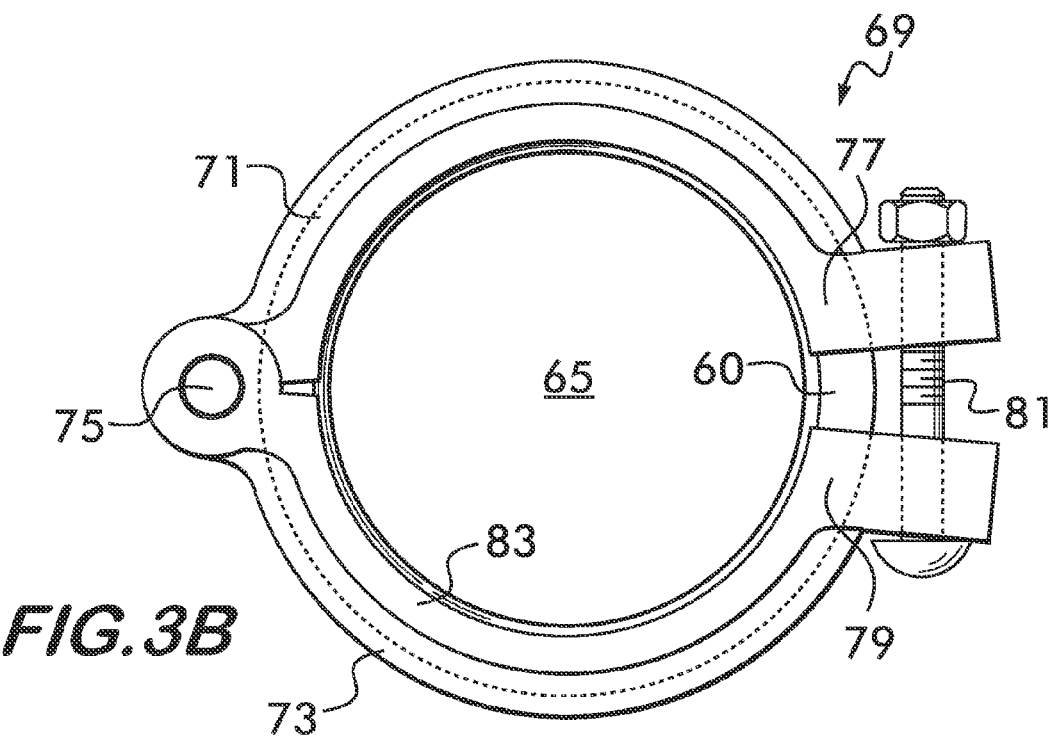

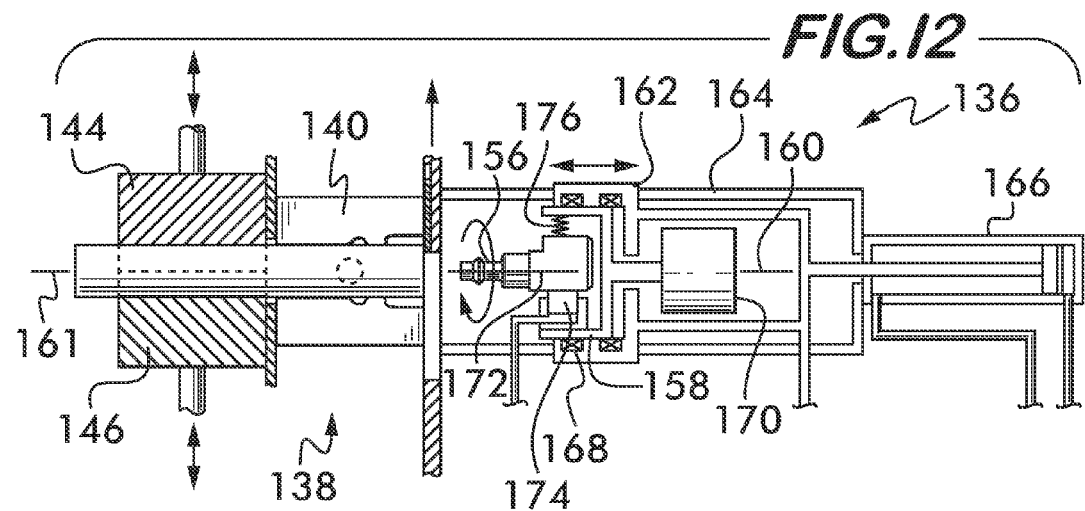
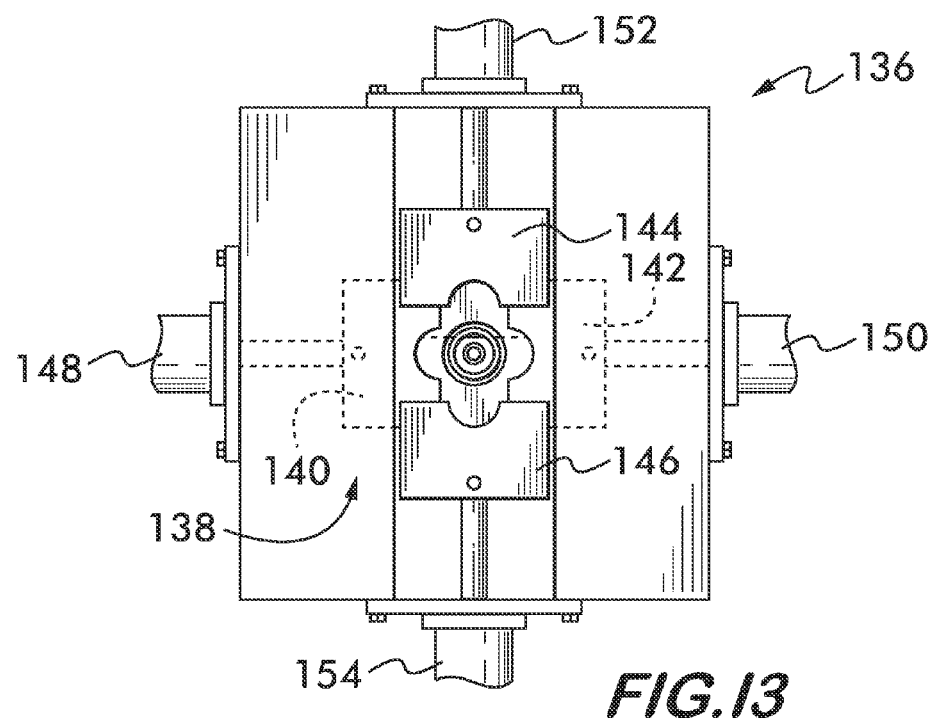

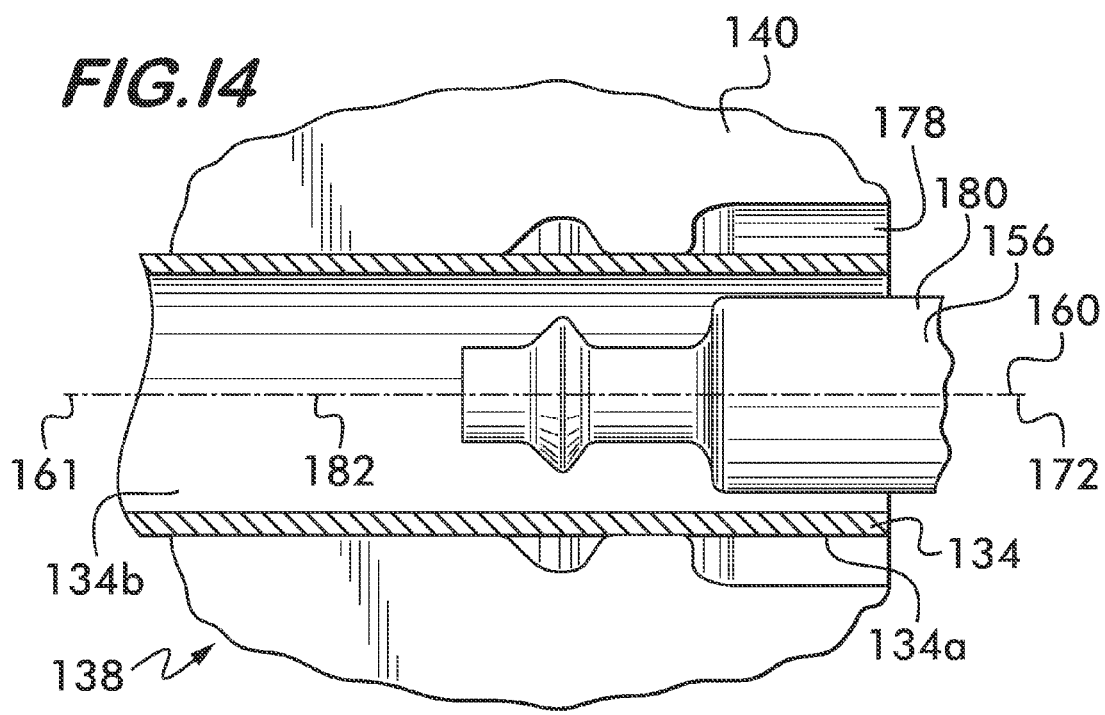
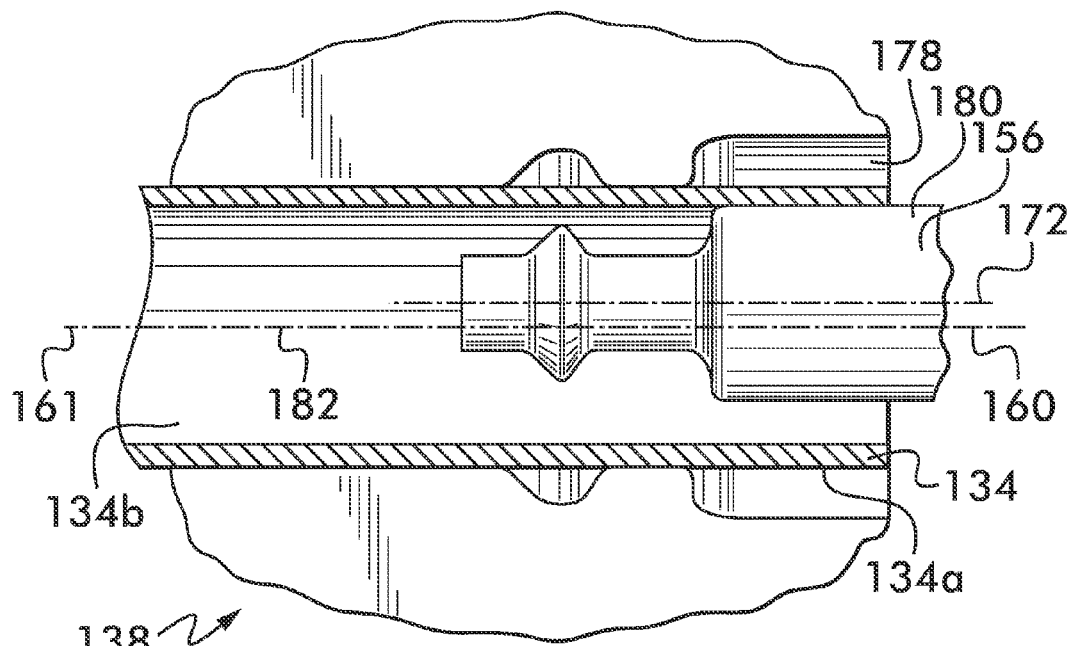

PIPE ELEMENT HAVING SHOULDER, GROOVE AND BEAD AND METHODS AND APPARATUS FOR MANUFACTURE THEREOF

CROSS REFERENCE TO RELATED APPLICATIONS

This application is based upon and claims priority to: U.S. Provisional Application No. 61/418,967, filed Dec. 2, 2010, and to: U.S. Provisional Application No. 61/530,771, filed Sep. 2, 2011, both of these provisional applications being hereby incorporated by reference herein in their entirety.

FIELD OF THE INVENTION

This invention relates to pipe elements joined together by mechanical couplings and methods and apparatus for making such pipe elements.

BACKGROUND

Various challenges are encountered when designing pipe elements to be joined by mechanical pipe couplings. Such couplings comprise two or more coupling segments joined in end to end relation by threaded fasteners. The segments surround a central space which receives the pipe elements. Each segment has a pair of arcuate projections known as "keys" which engage the outer surfaces of the pipe elements. The keys are often received in circumferential grooves in the pipe elements which provide a positive mechanical engagement against bending and axial loads applied to the joint. Each segment also defines a channel between its pair of arcuate projections which receives a ring-shaped gasket. The gasket is typically compressed between the segments and the pipe elements to effect a fluid tight joint.

Circumferential grooves are advantageously formed by cold working the sidewall of the pipe element because, unlike cut grooves, material is not removed from the pipe sidewall and thus thinner walled pipe elements may be grooved by the cold working process. It is advantageous to use thinner walled pipe elements for weight and cost savings in high pressure and/or high load applications. However, prior art cold working methods and pipe designs do not produce coupling and pipe element engagement features adequate for high loads and pressures sustainable by comparable cut groove systems used on thicker walled pipe elements. There are clear advantages to be had through improvements to the design and manufacture of thin walled grooved pipe elements by cold working which will allow thin walled grooved pipe elements to be joined by mechanical couplings and used in high pressure/high load applications.

SUMMARY

The invention concerns a pipe element having an outer diameter and at least one end. In one example, the pipe element comprises a shoulder positioned at the end. The shoulder extends circumferentially around the pipe element and has an outwardly facing surface. The outwardly facing surface has an outer diameter greater than the outer diameter of the pipe element excluding the shoulder. A groove is positioned adjacent to the shoulder. The groove extends circumferentially around the pipe element. The groove is defined by a first side surface positioned contiguous with the shoulder, a second side surface positioned in spaced apart relation to the first side surface, and a floor surface extending between the first and second side surfaces. The floor surface has an outer diameter less than the outer diameter of the pipe element excluding the groove.

In another embodiment, the pipe element further comprises a bead positioned contiguous with the groove. The bead extends circumferentially around and projects radially outwardly from the pipe element. The bead has an apex with an outer diameter greater than the outer diameter of the pipe element excluding the bead.

The invention also includes a pipe element having an outer diameter and first and second ends. In this example embodiment the pipe element comprises first and second shoulders positioned respectively at the first and second ends. Each of the first and second shoulders extends circumferentially around the pipe element and has an outwardly facing surface. Each of the outwardly facing surfaces has an outer diameter greater than the outer diameter of the pipe element excluding the first and second shoulders. In this embodiment, first and second grooves are positioned adjacent, respectively, to the first and second shoulders. Each of the first and second grooves extends circumferentially around the pipe element. Each of the first and second grooves is defined, respectively, by a first side surface positioned contiguous with one of the first and second shoulders, a second side surface positioned in spaced apart relation to the first side surface, and a floor surface extending between the first and second side surfaces. The floor surface of each of the first and second grooves has a respective outer diameter less than the outer diameter of the pipe element excluding the grooves.

This embodiment may further comprise first and second beads positioned contiguous, respectively, with the first and second grooves. Each of the first and second beads extends circumferentially around and projects radially outwardly from the pipe element. Each of the first and second beads has a respective apex with an outer diameter greater than the outer diameter of the pipe element excluding the first and second beads.

The invention further encompasses the combination of a coupling and at least one pipe element. The pipe element has an outer diameter and at least one end. The coupling comprises a plurality of segments attached to one another end to end surrounding a central space for receiving the end of the pipe element. Each of the segments has an arcuate surface for engaging the pipe element received within the central space. In this example embodiment, the pipe element comprises a shoulder positioned at the end. The shoulder extends circumferentially around the pipe element and has an outwardly facing surface. The outwardly facing surface has an outer diameter greater than the outer diameter of the pipe element excluding the shoulder. A groove is positioned adjacent to the shoulder. The groove extends circumferentially around the pipe element. The groove is defined by a first side surface positioned contiguous with the shoulder, a second side surface positioned in spaced apart relation to the first side surface, and a floor surface extending between the first and second side surfaces, the floor surface having an outer diameter less than the outer diameter of the pipe element excluding the groove. The arcuate surfaces of the segments are received within the groove.

In this embodiment the pipe element may further comprise a bead positioned contiguous with the groove. The bead extends circumferentially around and projects radially outwardly from the pipe element. The bead has an apex with an outer diameter greater than the outer diameter of the pipe element excluding the bead.

In another aspect, the invention includes first and second rollers for imparting a shape to a sidewall of a pipe element.

In this aspect an example of the first roller comprises a first segment having a first outer diameter and a second segment positioned contiguous with the first segment. The second segment has a second outer diameter smaller than the first outer diameter. A third segment is positioned contiguous with the second segment and has a third outer diameter larger than the second outer diameter. An eighth segment is positioned contiguous with the third segment and has an eighth outer diameter smaller than the second outer diameter. A ninth segment is positioned contiguous with the eighth segment and has an eighth outer diameter approximately equal to the second outer diameter.

In this aspect of the invention an example second roller comprises a fourth segment having a fourth outer diameter and a fifth segment positioned contiguous with said fourth segment and having a fifth outer diameter greater than the fourth outer diameter. A sixth segment is positioned contiguous with said fifth segment and has an sixth outer diameter less than the fifth outer diameter. A seventh segment is positioned contiguous with said sixth segment and has a seventh outer diameter approximately equal to the fifth outer diameter.

In one particular embodiment, the fifth segment comprises a first annular surface positioned adjacent to the fourth segment and oriented substantially perpendicularly to the second axis, and a second annular surface positioned adjacent to the sixth segment and oriented angularly with respect to the second axis.

The invention also includes a device using the first and second rollers for cold working an end of a pipe element so as to impart a shape to the sidewall of the pipe element. The device comprises a support frame. The first roller is mounted on the support frame and is rotatable about a first axis. The first roller is adapted to engage an inner surface of the pipe element. Means for rotating the first roller about the first axis are also provided. The second roller is mounted on the support frame and is rotatable about a second axis oriented substantially parallel to the first axis. The second roller is movable toward and away from the first roller and is adapted to engage an outer surface of the pipe element. Means for moving the second roller relatively to the first roller for compressing the sidewall while the rollers rotate are also provided. The rollers are arranged relatively to one another on the support frame such that:

the fourth segment is aligned with the first segment;
the fifth segment is aligned with the second segment;
the sixth segment is aligned with the third segment.

The rotating means may comprise an electric motor or a hydraulic motor operated by a pump, and the moving means may comprise a hydraulic actuator or a jackscrew by way of example.

The invention further encompasses a method of imparting a shape to the sidewall of a pipe element having an inner surface and an outer surface by using the combination of first and second rollers. In one example, the method comprises:

contacting the inner surface of the pipe element at a first point on the first segment of the first roller;

contacting the outer surface of the pipe element at a third point on the fifth segment of the second roller;

rotating one of the first and second rollers thereby causing the other of the first and second rollers and the pipe element to rotate, the first roller circumferentially traverses the inner surface of the pipe element, and the second roller circumferentially traverses the outer surface of the pipe element;

moving one of the first and second rollers toward the other of the first and second rollers and deforming the sidewall of the pipe element through contact between the inner surface of the pipe element and the first and third segments of the first roller, and contact between the outer surface of the pipe element and the fifth and seventh segments of the second roller;

continue moving one of the first and second rollers toward the other of the first and second rollers and compressing the sidewall of the pipe element between the first segment of the first roller and the fourth segment of the second roller;

continue moving one of the first and second rollers toward the other of the first and second rollers and compressing the sidewall of the pipe element between the second segment of the first roller and the fifth segment of the second roller; and continue moving one of the first and second rollers toward the other of the first and second rollers and compressing the sidewall of the pipe element between the third segment of the first roller and the fifth and seventh segments of the second roller.

The invention further encompasses a spin forming method for forming a circumferential shoulder, groove and bead in a pipe element. An example spin forming method comprises:

capturing an end of the pipe element in a die;

inserting a tool within the pipe element;

revolving the tool in an orbit about a longitudinal axis of the pipe element;

increasing the diameter of the orbit while revolving the tool so as to force the tool against an inner surface of the pipe element;

conforming the pipe element to the die so as to form a circumferential shoulder therein, the shoulder having a larger outer diameter than the outer diameter of the remainder of the pipe element;

conforming the pipe element to the die so as to form a circumferential bead therein, the bead having an apex with a larger outer diameter than the outer diameter of the remainder of the pipe element;

forcing the tool against the inner surface of the pipe element while revolving the tool in the orbit of increasing diameter causing a portion of the tube between the shoulder and the bead to move radially inwardly away from the die thereby forming the groove, the groove having a smaller outer diameter than the outer diameter of the remainder of the pipe element.

BRIEF DESCRIPTION OF THE DRAWINGS

FIGS. 3A and 3B are elevational views of pipe coupling embodiments;

FIG. 12 is a schematic diagram of an example spin forming machine for manufacturing pipe elements using a spin forming method;

FIG. 13 is a schematic end view of the spin forming machine shown in FIG. 12; and FIGS. 14-16 are longitudinal sectional views illustrating an example method of spin forming pipe elements.

DETAILED DESCRIPTION

Figure 1:
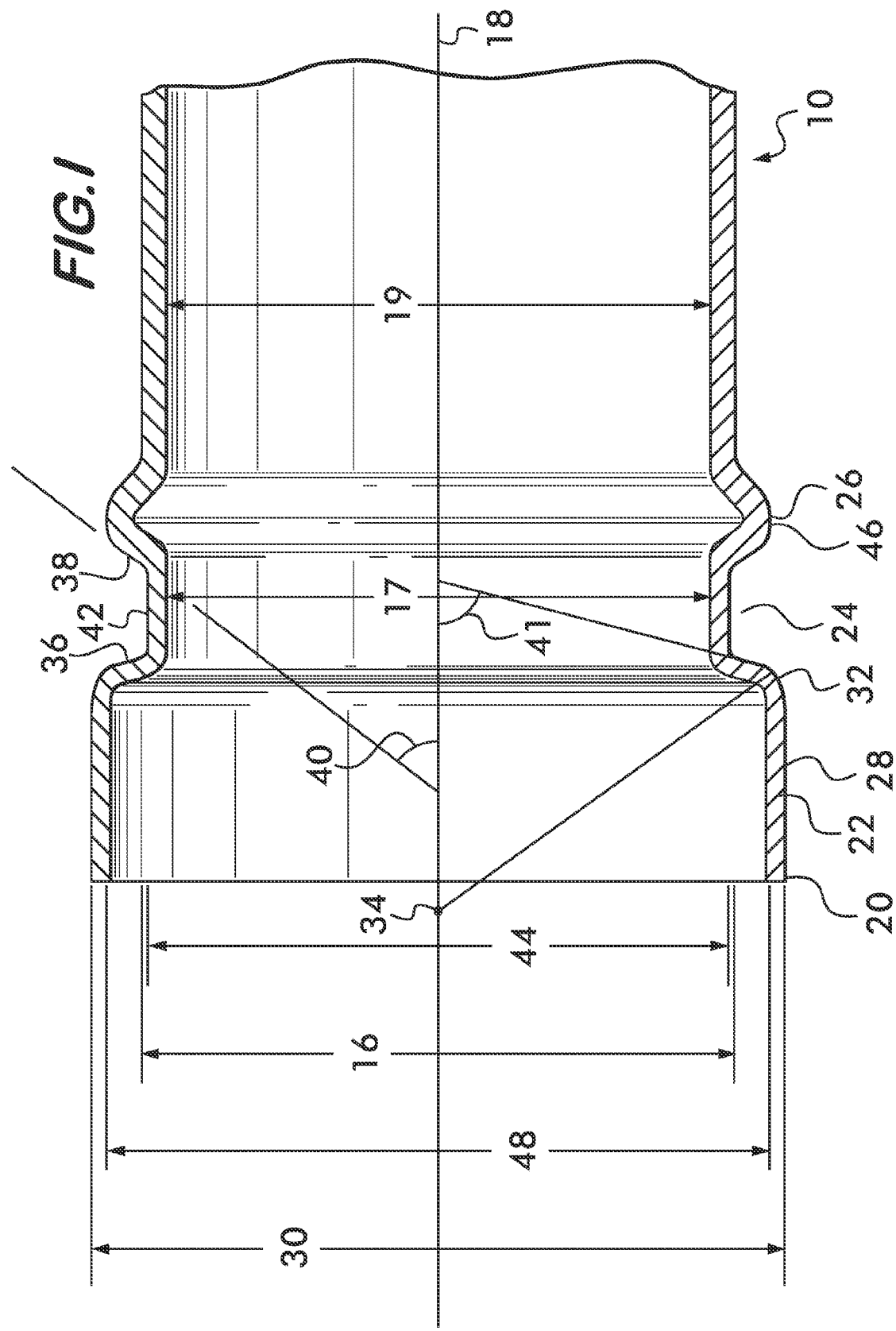
FIGS. 1 and 1A are longitudinal sectional views of example pipe elements.
Figure 2:
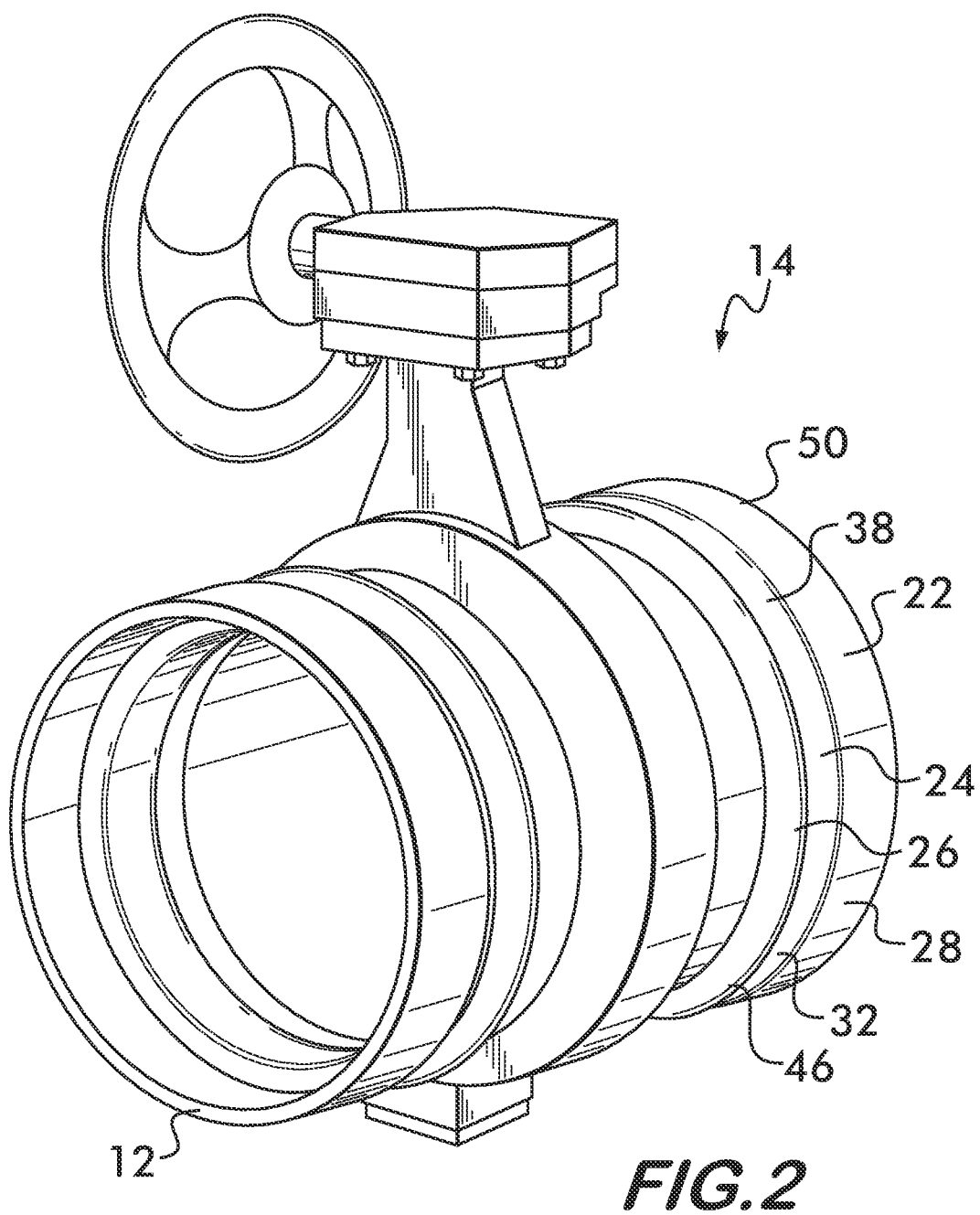
FIG. 2 is an isometric view of a valve including an example pipe element.

The invention concerns pipe elements, combinations of pipe elements and couplings, and methods and devices for cold working pipe elements to receive couplings and form a fluid tight joint. Throughout this document the term "pipe element" means any tubular structure, including, for example, pipe stock 10 as shown in FIG. 1, as well as the tubular portion 12 of a fluid handling or control component such as the valve 14 shown in FIG. 2. Other components, such as pumps and strainers, as well as fittings such as tees, elbows, bends and reducers are also included as having or comprising "pipe elements" as defined herein.

As shown in FIG. 1, pipe element 10 has an outer diameter 16 which passes through a point on a longitudinal axis 18 at the pipe element's center of curvature. At least one end 20 of pipe element 10 is configured to receive a key of a mechanical coupling (not shown), the configuration comprising a shoulder 22 positioned at the end 20, a groove 24 positioned adjacent to the shoulder 22, and a bead 26 positioned contiguous with the groove 24.

As illustrated in detail in FIG. 1, shoulder 22 extends circumferentially around the pipe element and has an outwardly facing surface 28. Surface 28 has an outer diameter 30 that is greater than the outer diameter 16 of the pipe element 10 excluding the shoulder. Shoulder 30 also has an outwardly facing curved surface 32. Curved surface 32 also extends circumferentially around the pipe element and has a center of curvature on an axis 34 oriented perpendicular to the longitudinal axis 18 of the pipe element 10. In FIG. 1, axis 34 is shown perpendicular to the viewing plane and is therefore seen end on.

Groove 24 is defined by a first side surface 36 which is positioned contiguous with the curved surface 32 of the shoulder 30. Side surface 36 may be oriented angularly. The orientation angle 41 may range from about 80° to about 85° with respect to the longitudinal axis 18. In another embodiment, the side surface 36 maybe oriented substantially perpendicularly to longitudinal axis 18. "Substantially perpendicularly" as used herein refers to an angular orientation which may not be exactly perpendicular, but is established as close as practicable in view of manufacturing practices and tolerances. Perpendicular orientation of the first side surface 36 stiffens the pipe element radially and helps it maintain its roundness.

A second side surface 38 further defines the groove 24. Second side surface 38 is positioned in spaced apart relation to the first side surface 36 and is oriented angularly with respect to the longitudinal axis 18. Side surface 38 may have an orientation angle 40 from about 40° to about 70°, or about 45° to about 65°. In the particular embodiment shown in FIG. 1, orientation angle 40 is about 55°, which is considered advantageous when the groove receives keys of a mechanical coupling as shown in FIGS. 3-6.

A floor surface 42 extends between the first side surface 36 and the second side surface 38 of groove 24. In the example embodiment shown, the floor surface 42 is substantially parallel to the longitudinal axis 18 and has an outer diameter 44 which is less than the outer diameter 16 of the pipe element excluding the groove. The groove 24 also has an inner diameter 17 which, in the embodiment shown in FIG. 1, is approximately equal to the inner diameter 19 of the pipe element 10.

Bead 26 is positioned contiguous with the second side surface 38 of the groove 24 and also extends circumferentially around the pipe element. The bead 26 projects outwardly away from axis 18 and has an apex 46 with an outer diameter 48 greater than the outer diameter 16 of the pipe element excluding the bead. In the example embodiment shown in FIG. 1, the diameter 48 of the apex 46 is less than the outer diameter 30 of shoulder 22. Bead 26 increases the radial stiffness of the pipe element and thereby helps maintain its roundness.

Figure 1A:
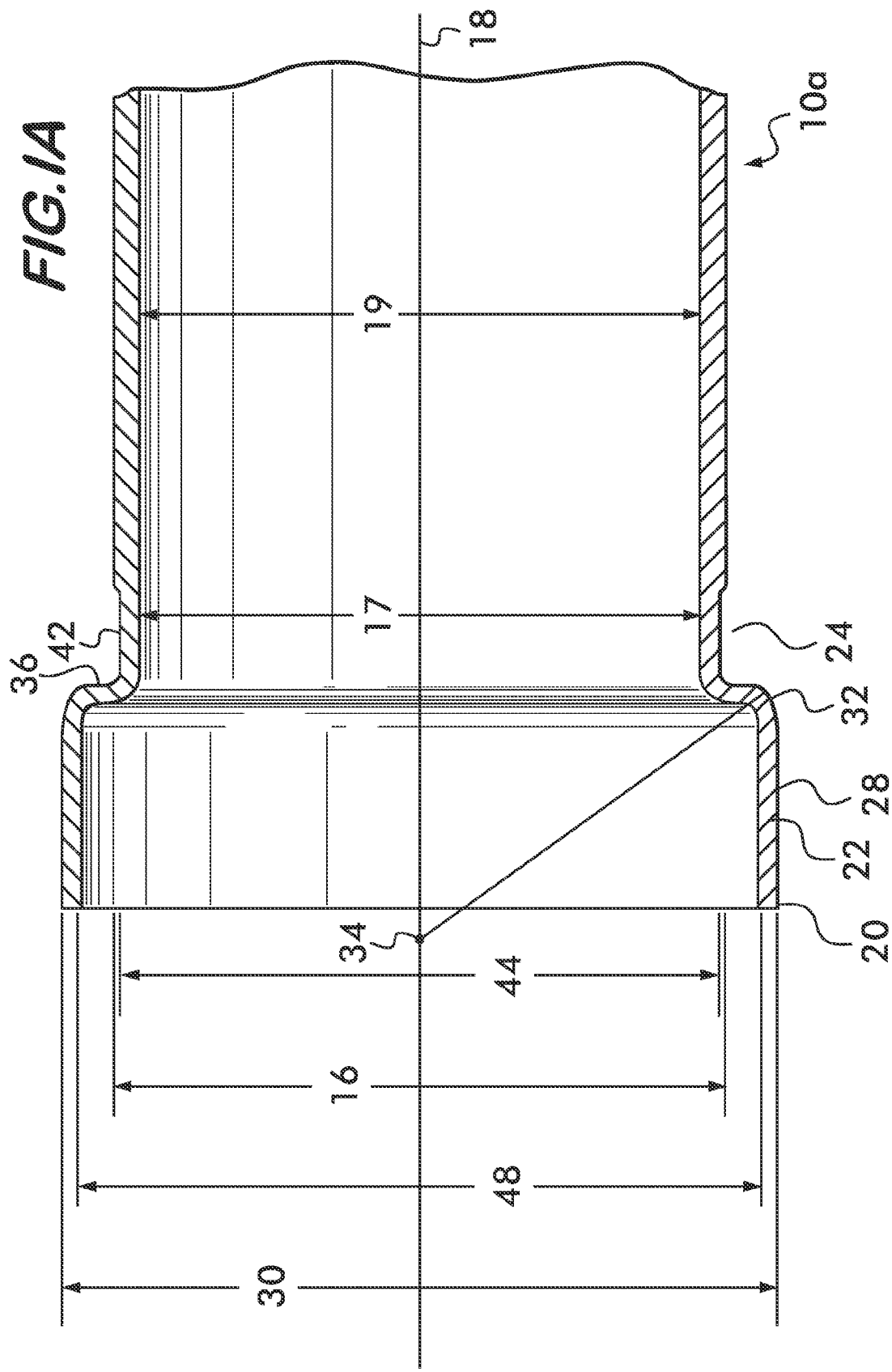

As shown in FIG. 1A, a beadless pipe element embodiment 10a is also feasible. Similar to the embodiment 10 shown in FIG. 1, for the embodiment 10a in FIG. 1A the floor surface 42 is substantially parallel to the longitudinal axis 18 and has an outer diameter 44 which is less than the outer diameter 16 of the pipe element excluding the groove. The groove 24 also has an inner diameter 17 which is approximately equal to the inner diameter 19 of the pipe element 10a.

Figure 3:
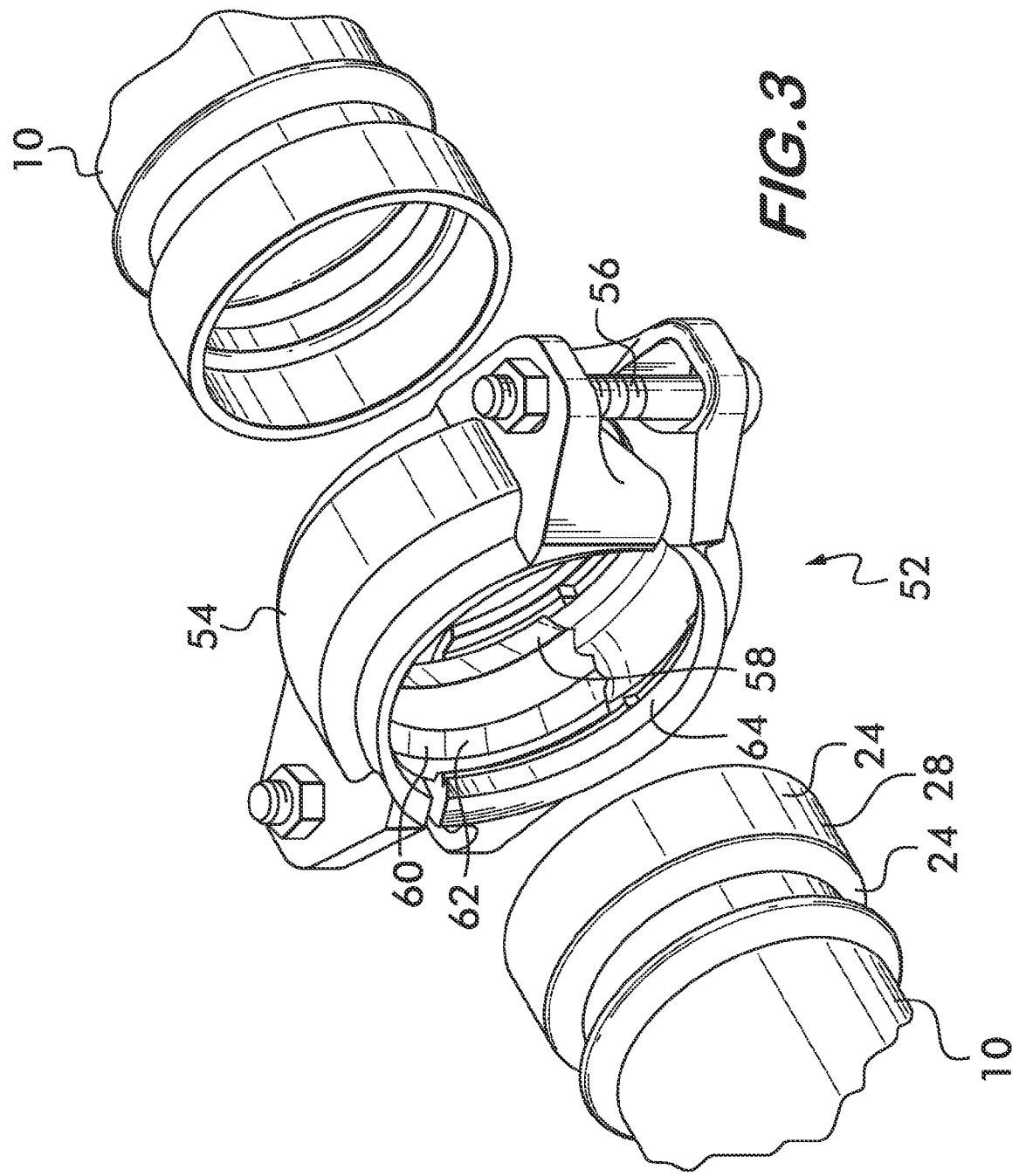
FIG. 3 is an exploded isometric view of a combination of pipe elements and a pipe coupling.

For pipe stock, the configuration of the end of the pipe element 10 (shoulder 22, groove 24 and bead 26) is the same at both ends (not shown for clarity), but other configurations are also feasible wherein the ends may be dissimilar. Furthermore, the pipe elements 50 at opposite ends of valve 14 also have the above-described end configurations which allow the valve, or any other fluid control component or fitting, to be joined to other pipe elements using mechanical couplings, examples of which are shown in FIGS. 3, 3A and 3B. Alternately, valves and other fluid control components and fittings may also have dissimilar end configurations.

In one embodiment, illustrated in FIG. 3, mechanical coupling 52 comprises two or more segments 54 attached to one another in end to end relation, in this example by threaded fasteners 56. The segments 54 surround a central space 58 which receives the pipe elements 10 to join them in a fluid tight joint. An elastomeric gasket 60 is captured between the segments 54 and has inwardly facing sealing surfaces 62 which engage the outwardly facing surfaces 28 of shoulders 24 to ensure fluid tightness. Each segment has a pair of arcuate surfaces or keys 64 which project inwardly toward the central space and are received within the grooves 24 of the pipe elements 10.

In another embodiment, shown in FIG. 3A, the coupling 53 comprises a single segment formed of a unitary body 55 having ends 57 and 59 in spaced apart, facing relation. Bolt pads 61 extend from the ends 57 and 59 and a fastener 63 extends between the bolt pads for drawing them together upon tightening of the fastener. The unitary body surrounds a central space 65 which receives the pipe elements to form a joint. Keys 67 in spaced relation on either side of the coupling 53 extend circumferentially along the unitary body 55 and project radially inwardly. A gasket 60 similar to that as described above is positioned between the keys. Tightening of the fastener 63 draws the keys 67 into engagement with grooves in the pipe elements and compresses the gasket 60 between the unitary body 55 and the pipe elements.

FIG. 3B shows another coupling embodiment 69, formed of two segments 71 and 73 joined at one end by a hinge 75. The opposite ends 77 and 79 of the segments are in spaced apart facing relation and connected by a fastener 81. Segments 71 and 73 also have circumferential keys 83 in spaced relation and a gasket 60 is positioned between them. The segments surround a central space 65 which receives the pipe elements to form a joint. Tightening of the fastener 81 draws the keys 83 into engagement with grooves in the pipe elements and compresses the gasket 60 between the segments and the pipe elements.

A joint may be formed between two pipe elements 10 by first disassembling the coupling 52 (see FIG. 3) and slipping the gasket 60 over an end of one of the pipe elements. The end of the other pipe element is then aligned in proximity with the end of the first pipe element, and the gasket is positioned so as to bridge the small gap between the two pipe element ends, with the sealing surfaces 62 of the gasket engaging respective outer surfaces 28 of the shoulders 24 of each pipe element. Next the coupling segments 54 are positioned surrounding the gasket 60 and the ends of the pipe elements with the keys 64 aligned with respective grooves 24 in each pipe element. Fasteners 56 are then applied and tightened so as to draw the segments toward one another, engage the keys 64 within respective grooves 24 and compress the gasket 60 against the pipe elements so as to form a fluid tight joint.

Figure 4:
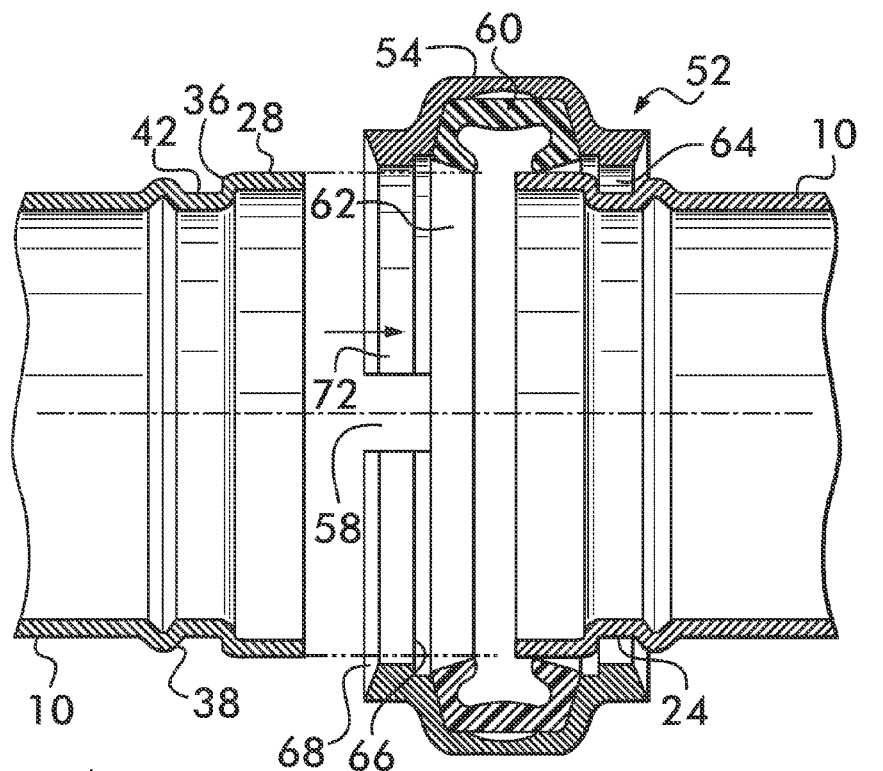
FIGS. 4-6 are longitudinal sectional views of a combination of pipe elements and a pipe coupling.
Figure 5:
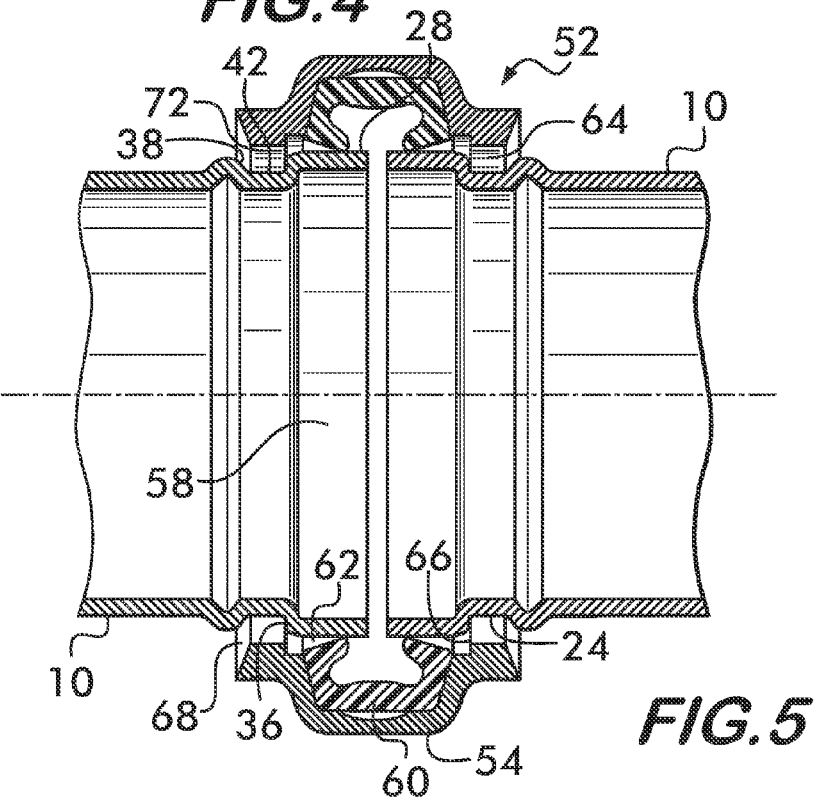
Figure 6:
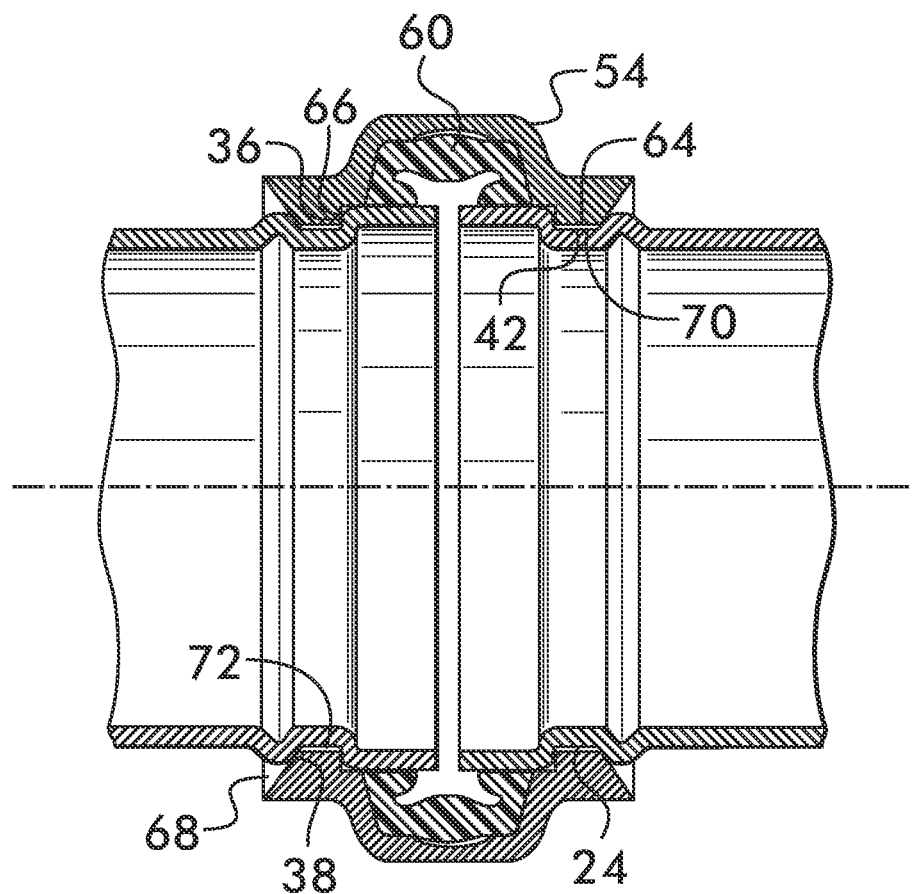

In an alternate embodiment, FIGS. 4-6 show in detail the engagement of the pipe elements 10 with an installation ready type coupling 52 wherein the segments 54 are pre-assembled and held in spaced relation from one another by fasteners 56, the segments being supported on the gasket 60. The segments are sufficiently far apart that the pipe elements 10 may be inserted into the central space 58 without disassembling the coupling as shown in FIGS. 4 and 5. Note that the outwardly facing surfaces 28 of shoulders 22 engage the sealing surfaces 62 of the gasket 60 and the keys 64 align with the grooves 24 in each of the pipe elements. As shown in FIG. 6, the fasteners 56 (see also FIG. 1) joining the segments 54 to one another are tightened, drawing the segments toward one another. This compresses the gasket 60 against the pipe elements to effect a seal and forces the keys 64 into the grooves 24 to effect a positive mechanical connection between the coupling and the pipe elements 10 to effect the joint. In one embodiment, shown in detail in FIG. 6, the keys 64 have a cross sectional shape that is compatible with the grooves, and the keys are dimensioned such that a first lateral key surface 66 engages the groove first side surface 36, and a second lateral key surface 68 engages the angularly oriented second side surface 38 of the groove. It is advantageous that the surfaces 68 and 38 have complementary orientation angles to maximize surface to surface contact. Orientation angles for lateral key surface 68 measured with respect to the pipe element longitudinal axis 18 (see also FIG. 1) from about 40° to about 70°, or from about 45° to about 65°, or about 55° are contemplated. It is also advantageous that surfaces 66 and 36 have complementary orientation angles. Orientation angles for lateral key surface 66 measured with respect to the pipe element longitudinal axis 18 (see also FIG. 1) from about 80° to about 85° are contemplated.

In general for this embodiment there will be a gap 70 between the groove floor surface 42 and a radially facing surface 72 of the key 64. This is due to tolerance variations in both the pipe element and the coupling. Some gap between surfaces 42 and 72 is advantageous to ensure that the keys engage the groove with a wedging action that provides rigidity to the joint and maintains the pipe elements in spaced relation to one another under axial compression and tension loads. Formation of the joint using coupling embodiments 53 and 69 shown in FIGS. 3A and 3B proceeds similarly as described above for the installation ready embodiment. Other embodiments are also feasible, for example, wherein only the vertical key surface 66 is in contact with the groove first side surface 36, or only the angularly oriented key surface 68 is in contact with the second side surface 38 of the groove 24. It is also possible that the coupling segments float on the gasket 60, wherein none of the key surfaces are in contact with the groove surfaces, at least initially until the joint is subjected to load.

Roll Forming

Figure 7:
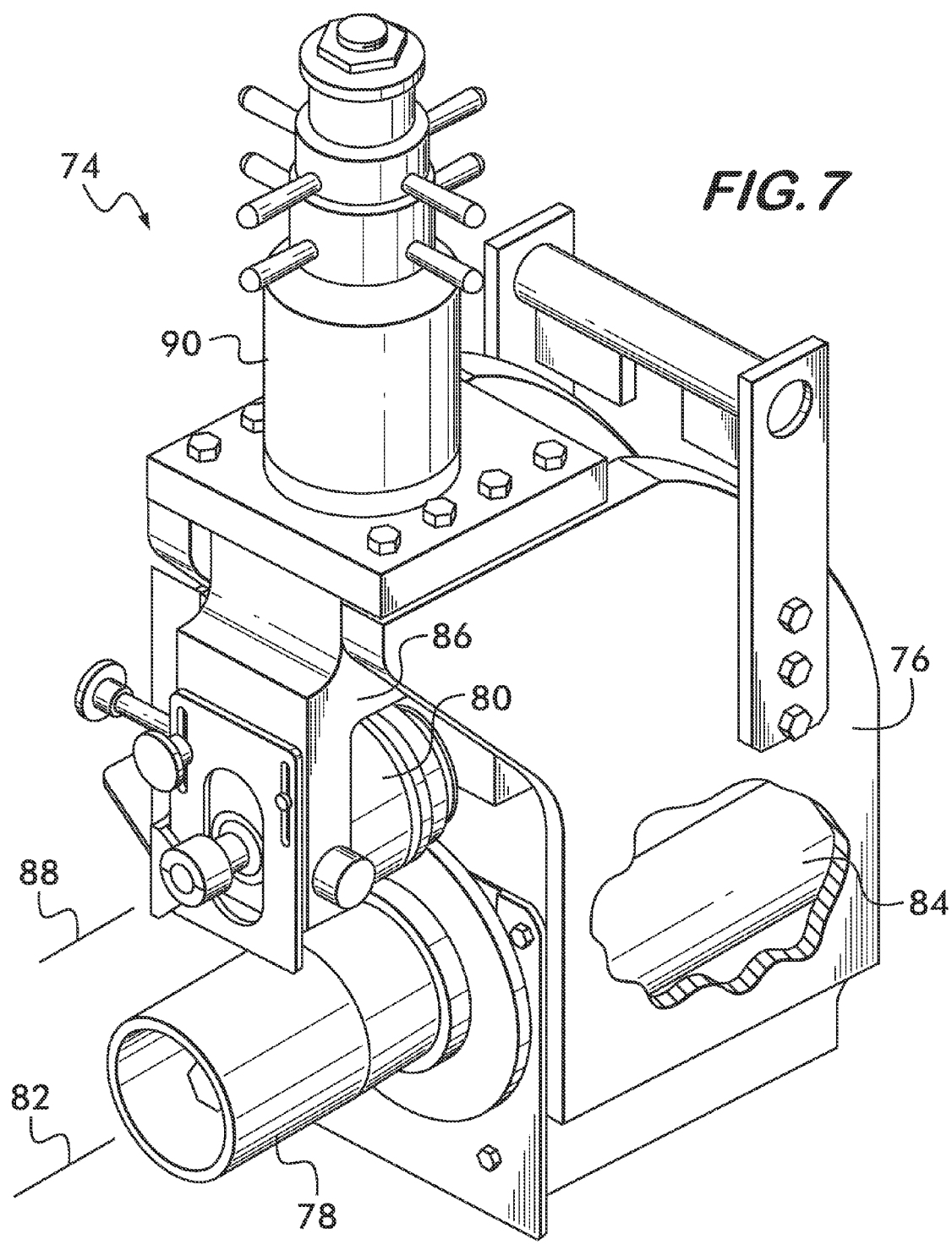
FIG. 7 is an isometric view of an example roll forming machine for manufacturing pipe elements using a roll forming method.

FIG. 7 shows a device 74 for roll forming the ends of a pipe element and imparting a shape to its sidewall. Device 74 comprises a support frame 76 on which is mounted a first or inner roller 78, and a second or outer roller 80. Inner roller 78 is mounted for rotation about an axis 82 and is adapted to engage and support an inner surface of a pipe element during the cold working process disclosed herein. Means 84 for rotating the inner roller are provided with device 74. Such means may include, for example an electric motor, or a hydraulic motor operated by a pump. Outer roller 80 is mounted on a yoke 86 and is free to rotate about an axis 88 which is substantially parallel to the axis of rotation 82 of the inner roller 78. Yoke 86 allows the outer roller 80 to move toward and away from the inner roller 78 so that it may engage an outer surface of the pipe element during roll forming. Means 90 are provided to move the outer roller 80 on yoke 86, and such means may comprise, for example, a hydraulic actuator or a jackscrew.

Figure 8:
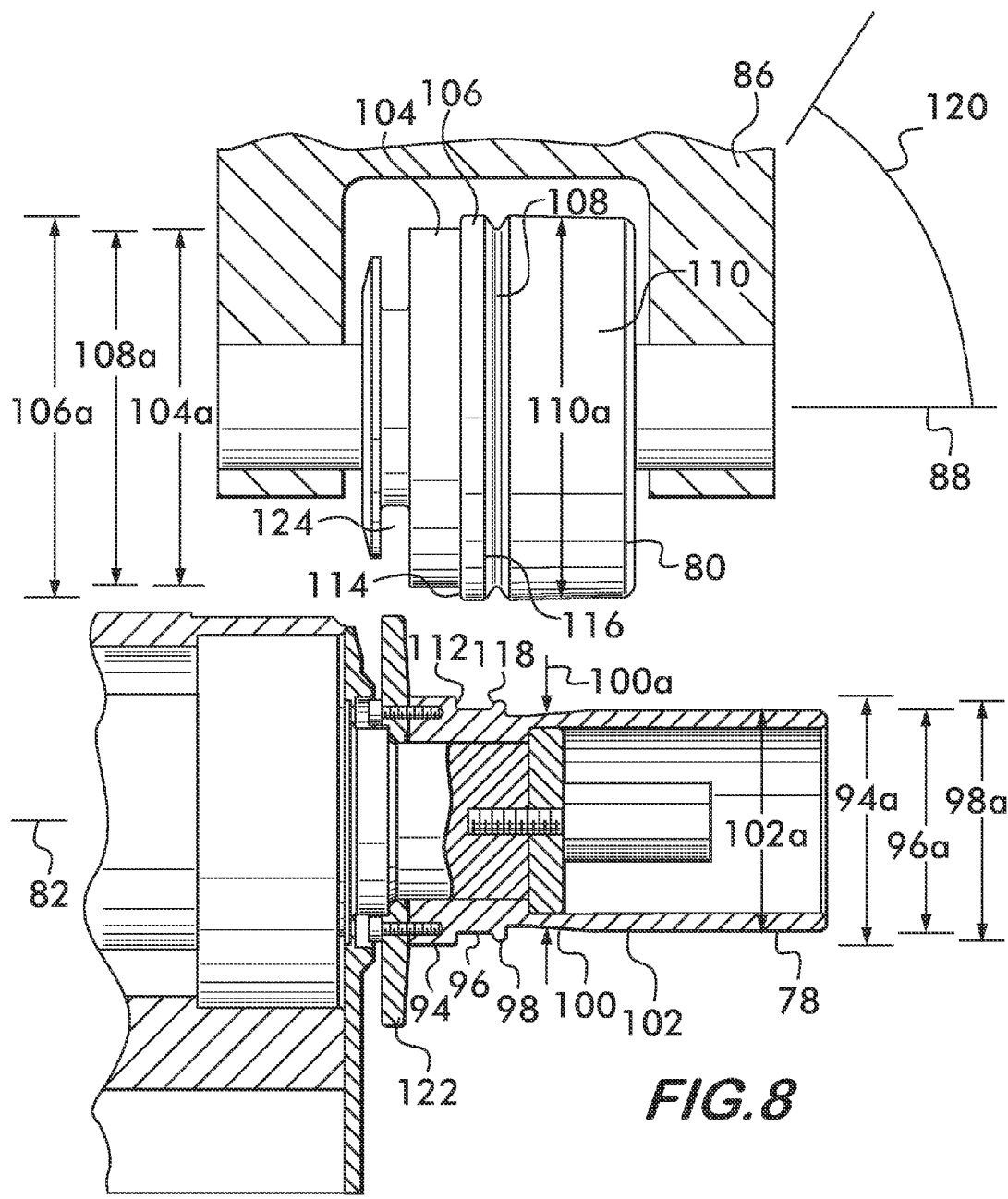
FIG. 8 is an elevational view of an example combination of rollers used to roll form pipe elements.

An example roller combination 92 of inner and outer rollers 78 and 80 according to the invention is shown in detail in FIG. 8. Inner roller 78 is formed of a plurality of segments having different outer diameters which cooperate with various segments comprising the outer roller 80 (which are also distinguishable from one another by their respective outer diameters) to impart a desired shape to the pipe element sidewall as described herein. Inner roller 78 is comprised of a first segment 94 having an outer diameter 94*a*, a second segment 96 positioned contiguous with the first segment and having an outer diameter 96*a* smaller than outer diameter 94*a*, a third segment 98 positioned contiguous with the second segment and having an outer diameter 98*a* larger than outer diameter 96*a*, a fourth segment 100 positioned contiguous with the third segment and having an outer diameter 100*a* smaller than outer diameter 96*a*, and a fifth segment 102 positioned contiguous with the fourth segment and having an outer diameter 102*a* approximately equal to outer diameter 96*a*. Similarly, outer roller 80 is comprised of a first segment 104 having an outer diameter 104*a*, a second segment 106 positioned contiguous with the first segment 104 and having an outer diameter 106*a* greater than outer diameter 104*a*, a third segment 108 positioned contiguous with the second segment 106 and having outer diameter 108*a* less than outer diameter 106*a*, and a fourth segment 110 positioned contiguous with the third segment 108 and having an outer diameter 110*a* approximately equal to outer diameter 106*a*.

When the roller combination shown in FIG. 8 is mounted on device 74 for cold working the sidewall of a pipe element, the rollers are aligned so as to cooperate with one another and impart the desired sidewall shape. In the example shown in FIGS. 8-11, the segment 94 on the inner roller 78 is aligned with segment 104 on the outer roller 80; segment 96 on the inner roller is aligned with segment 106 on the outer roller; segment 98 on the inner roller is aligned with segment 108 on the outer roller, and segments 100 and 102 on the inner roller are aligned with segment 110 on the outer roller.

Annular surfaces on each of the rollers, formed when there are contiguous segments on the same roller having different outer diameters, also cooperate in pairs with one another to impart the desired shape to the pipe element sidewall. As further shown in FIG. 8, an annular surface 112 positioned on inner roller 78 between segments 94 and 96 cooperates with an annular surface 114 positioned on outer roller 80 between segments 104 and 106 to form the first side surface 36 of the groove 24. Annular surface 114 can be considered part of segment 106 and, in this example, is oriented substantially perpendicularly to the axis of rotation 88 of the outer roller 80. Additionally, an annular surface 116 positioned on outer roller 80 between segments 106 and 108 cooperates with an annular surface 118 positioned on inner roller 78 between segments 96 and 98 to form the second side surface 38 of groove 24. Annular surface 116 may also be considered part of segment 106, and is angularly oriented with respect to axis 88. Orientation angles 120 may range from about 40° to about 70°, or from about 45° to about 65°, or may be at about 55°. In the example shown the annular surfaces on the inner roller 78 will have substantially the same orientation as the annular surface on the outer roller 80 with which they cooperate, however, other configurations are of course feasible. Proper alignment between the rollers 78 and 80 and their respective segments and annular surfaces is established and maintained by a flange 122, which, in this example, extends radially outwardly from the inner roller 78 and engages a groove 124 in the outer roller 80 when the outer roller 80 is moved towards the inner roller 78 to compress the pipe element between them during cold working.

Figure 9:
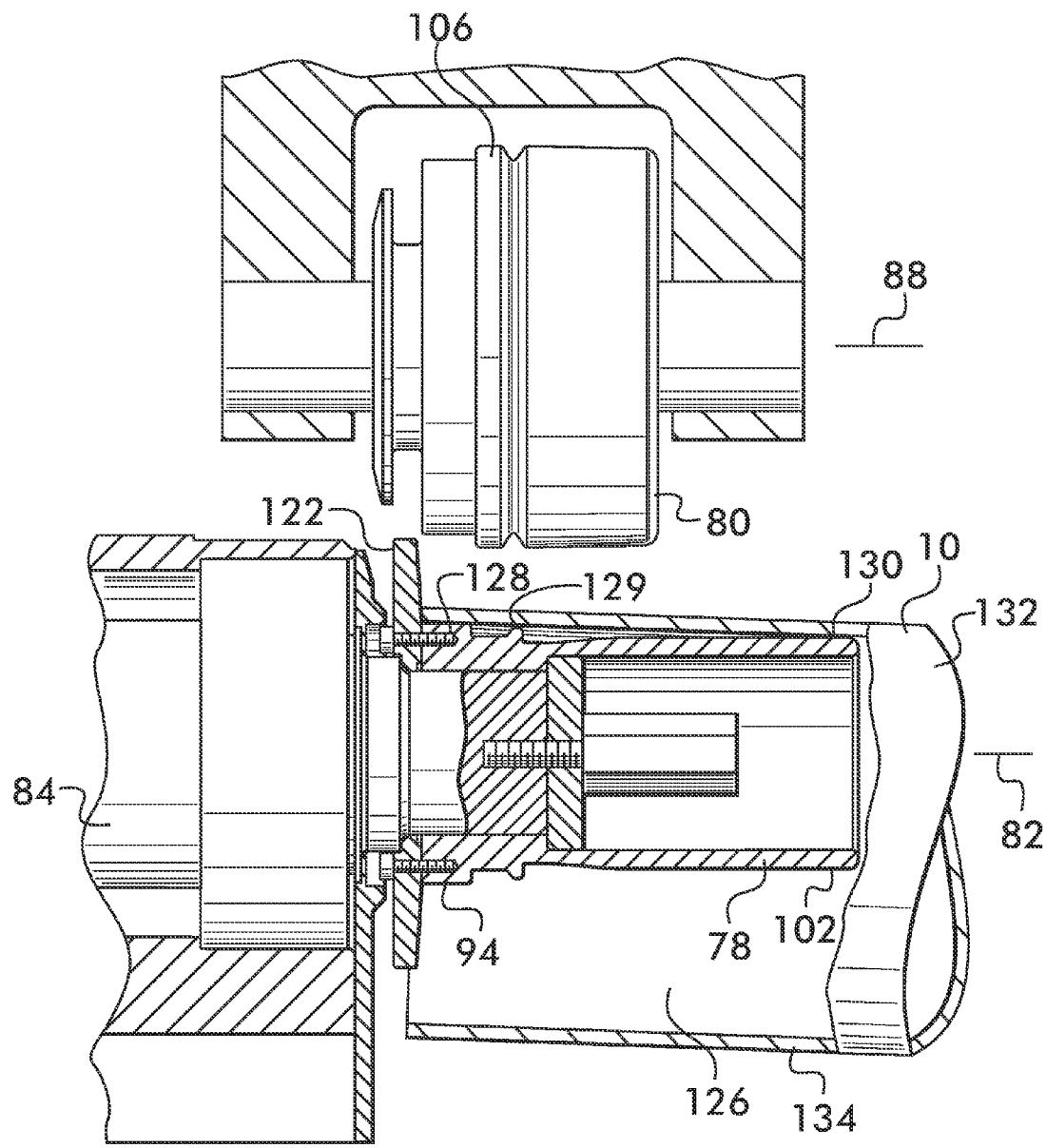
FIGS. 9-11 are longitudinal sectional views illustrating an example method of roll forming pipe elements.
Figure 10:
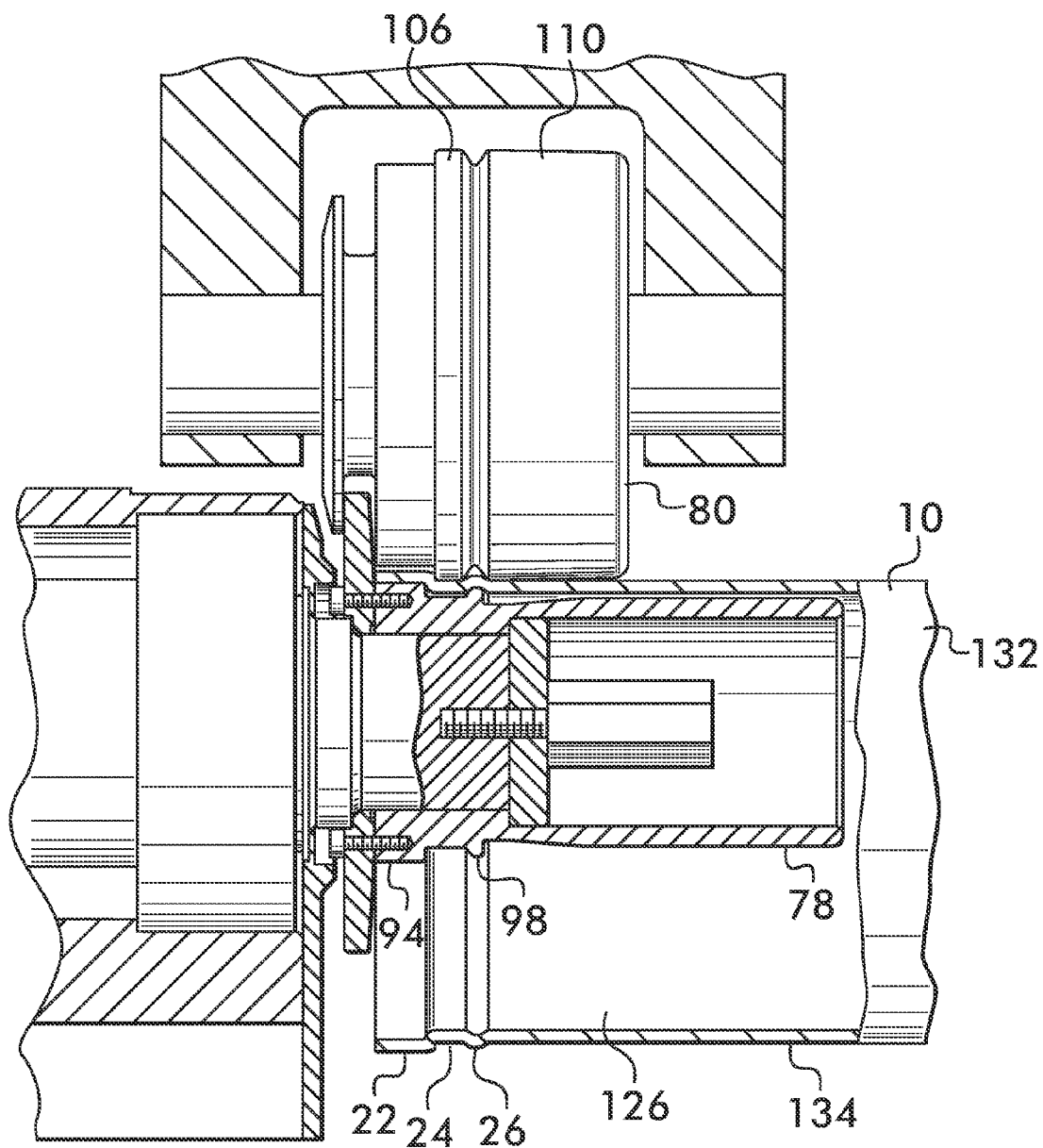
Figure 11:
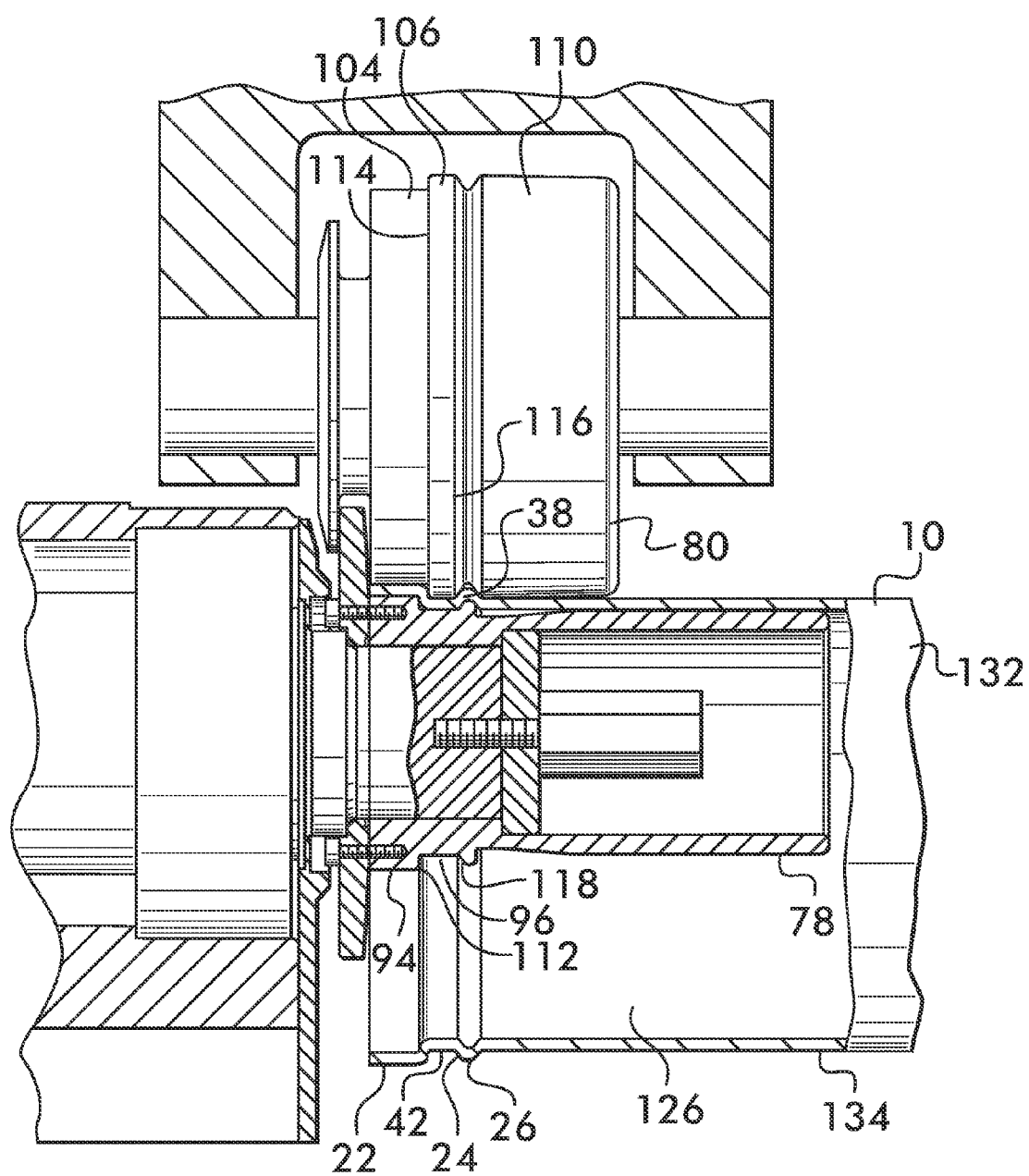

FIGS. 9-11 illustrate an example method of roll forming a pipe element 10 to impart the sidewall shape as shown in FIG. 1. As shown in FIG. 9, pipe element 10 is supported on inner roller 78 with its inner surface 126 contacting at least two of the segments 94, 98 and 102 at respective contact points 128, 129 and 130. For relatively short pipe elements, contact may be at 128, 129 and 130 or at any two of the three. For longer pipe elements contact will be at 128 and may be at 129 and 130. Outer roller 80 is moved toward the inner roller 78 and contacts the outer surface 132 of pipe element 10 with segment 106. Flange 122 on inner roller 78 acts as a stop to properly position the pipe element axially on the rollers. Once both the inner and outer rollers 78 and 80 are in contact with the pipe element 10 the inner roller is rotated about axis 82 by rotating means 84. This causes pipe element 10 to rotate in the same direction as the inner roller 78, and the outer roller 80 to rotate in the opposite direction about its axis 88. While it is advantageous to rotate the inner roller and move the outer roller toward it, it is understood that other combinations of rotating and moving the rollers are also feasible. It is further practical to hold the pipe element fixed and stationary and move the machine around the pipe element's longitudinal axis while compressing the pipe element sidewall between two rollers. In this case both of the rollers may be idlers, i.e. not powered in rotation, but rotate as a result of friction between the rollers and the pipe element.

As shown in FIG. 10, outer roller 80 is moved toward the inner roller 78 to compress the pipe element between the rollers while the rollers are rotating. The pipe element sidewall 134 is thereby deformed through contact between the pipe element inner surface 126 and segments 94 and 98 of inner roller 78, and segments 106 and 110 of outer roller 80. This action begins to form the shoulder 22, the groove 24 and bead 26 in the sidewall 134. The rollers and pipe element continue to rotate, and, as shown in FIG. 11, the outer roller 80 is moved further towards inner roller 78 to further compress the sidewall 134. Sidewall 134 is compressed between segments 94 and 104 to form the shoulder 22, the compressive force between the segments thinning the sidewall over the region of the shoulder 22 and enlarging its diameter to a desired final outer diameter 30 as shown in FIG. 1. Sidewall 134 is also compressed between segments 96 and 106 to establish the final dimensions of the groove floor 42, including its outer diameter 44 shown in FIG. 1. In certain embodiments, the sidewall 134 is also compressed between segments 96 and 106 to establish the inner diameter 17 of the portion of the pipe element 10 comprising the groove 24 to be approximately equal to the pipe inner diameter 19 (which is not compressed between the rollers) as shown in FIG. 1. As further shown with respect to FIG. 11, the sidewall 134 is compressed between annular surface 116 and the annular surface 118 to form the second side surface 38 of the groove 24 (the first side surface having been formed by cooperation between annular surfaces 112 and 114). Segment 110 also contacts the outer surface 132 of the pipe element 10 to assist in forming the bead 26.

Spin Forming

It is advantageous to form the circumferential shoulder, groove and bead using spin forming techniques. Spin forming uses a fixed outer die and a roller tool which revolves in an orbit within the die. The pipe element is held within the die between it and the tool, and the tool orbits about the pipe's longitudinal axis. The tool's orbit is increased in diameter and the tool is forced against the inner surface of the pipe element. As the tool revolves it forces the end of the pipe element to conform in shape to the shape of the tool and die.

Spin forming is advantageous because it eliminates the sensitivity of the process to the pipe element outer diameter tolerance variation. While techniques such as roll forming may be used to cold work the pipe element and produce the desired shoulder-bead-groove shape, it is difficult to establish the shoulder and the groove outer diameters with an acceptable degree of repeatability due to the variation in pipe element outer diameter. However, by using spin forming with its fixed outer die, the dimensional variations of the pipe element outer diameter are not relevant since the outer die reliably establishes the pipe element's outer surface dimensions regardless of the initial diameter of the pipe element.

FIGS. 12 and 13 schematically depict an example spin forming machine 136. As shown in FIG. 13, the machine 136 includes a die 138 formed in four sections 140, 142, 144 and 146. The die sections are mounted in bearings (not shown) and are slidably moveable toward and away from one another using respective actuators 148, 150, 152 and 154. In this example there are four die sections configured in offset pairs (140 and 142, 144 and 146) but dies having only two sections are also feasible. As shown in FIG. 12, a spin forming tool 156 is mounted in a housing 158. Housing 158 has a fixed axis of rotation 160 and is mounted on a carriage 162 which moves along guide rods 164 toward and away from the die 138. An actuator 166 effects motion of the carriage 162 and hence motion of the spin forming tool 156 toward and away from the die. Housing 158 is driven in rotation about axis 160 relatively to carriage 162 on bearings 168 by an electric motor 170 also mounted on the carriage. The axis of rotation 160 of housing 158 is substantially parallel to the longitudinal axis 161 of the opening defined when the die sections 140, 142, 144 and 146 are brought together. However, the spin forming tool 156 may be moved relatively to the housing 158 in a direction so as to offset its longitudinal axis 172 from the housing axis of rotation 160. Offset motion of the spin forming tool 156 is via an actuator 174 mounted on the housing 158. A spring 176 provides restoring force which moves the spin forming tool's longitudinal axis 172 back into coaxial alignment with the housing axis of rotation 160 when force of the actuator 174 is relieved.

As shown in FIG. 14, the die sections (140 being shown) have an inner surface 178 shaped to produce a desired final shape of the outer surface 134a of the pipe element 134 during spin forming. Furthermore, the spin forming tool 156 has an outer surface 180 shaped to cooperate with the inner surfaces 178 of the die sections and allow the material of the pipe element 134 to deform and flow so that when, during the spin forming process, the outer surface 180 of the spin forming tool 156 is forced against the inner surface 134b of the pipe element 134, the outer surface 134a of the pipe element 134 takes the desired shape defined by the inner surfaces 178 of die 138.

Figure 16:
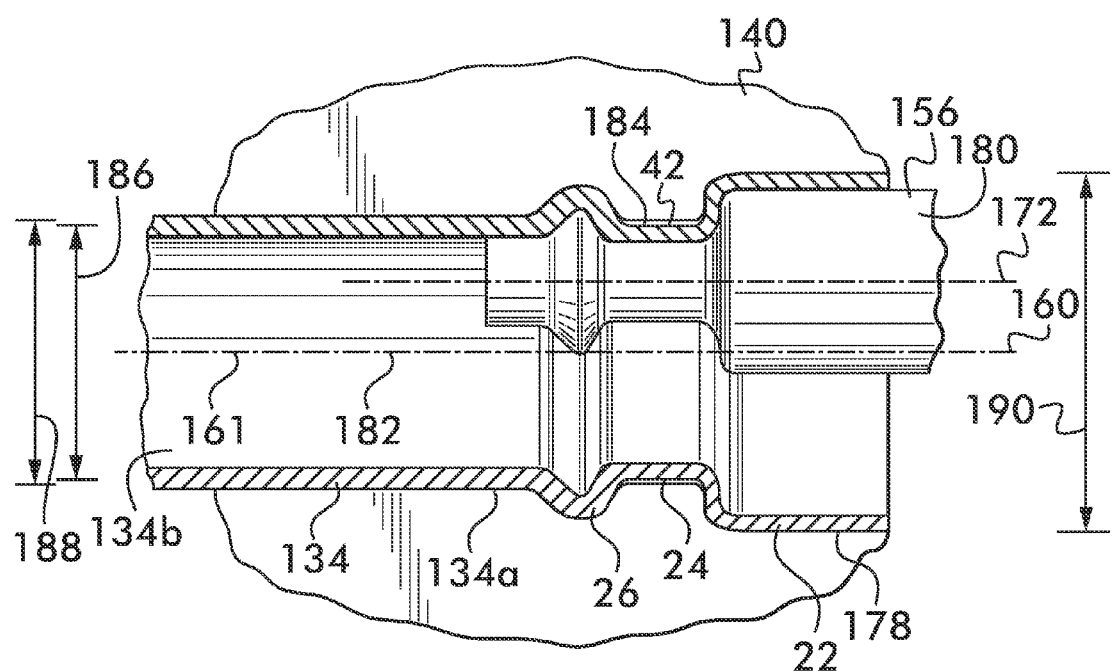

In operation, as illustrated in FIGS. 13-16, actuators 148 and 150 move respective die sections 140 and 142 away from one another. Similarly, actuators 152 and 154 move respective die sections 144 and 146 away from one another, thereby opening the die 138. The pipe element 134 may then be inserted into the die. As shown in FIG. 14, the die 138 is then closed by bringing the respective die sections 140 and 142, 144 and 146 together using their respective actuators to capture the end of the pipe element 134. Next, as shown in FIGS. 12 and 14, actuator 166 moves carriage 162 toward the die 138. Spin forming tool 156 with its longitudinal axis 172 positioned at this time in coaxial alignment with the axis of rotation 160 of housing 158, and hence also in coaxial alignment with both the longitudinal axis 161 defined by the die 138 and the longitudinal axis 182 of the pipe element 134, is moved toward the die 138. The spin forming tool 156 is inserted within the pipe element 134 captured by the die. Housing 158 is then rotated by motor 170 about its axis of rotation 160, and the actuator 174 moves the longitudinal axis 172 of the spin forming tool 156 out of coaxial alignment with the longitudinal axis 160 of the housing. This configuration is shown in FIG. 15, where the axis 172 of spin forming tool 156 is also offset from the longitudinal axis 182 of pipe element 134. This eccentric configuration causes the spin forming tool 156 to revolve around the longitudinal axis 182 of the pipe element 134 in a circular orbit upon rotation of the housing 158. The diameter of the orbit increases as the actuator 174 continues to move the spin forming tool 156 further off the axis of rotation 160 of the housing 158. Continued motion of the spin forming tool 156 relative to housing 158 while the housing is rotating forces the tool against the inner surface 134b of the pipe element 134. As shown in FIG. 16, the spin forming tool 156 travels around the pipe element inner surface in its orbit and cold works the material, forcing the outer surface 134a of the pipe element 134 to substantially conform to the shape of the inner surfaces 178 of the die 138. In this example, the shoulder 22, groove 24 and bead 26 are formed. However, it is also possible to form only a shoulder and the groove, or only the bead and the groove, depending on the shape of the die and the spin forming tool. Note that to mitigate friction between the spin forming tool 156 and the inner surface 134b of the pipe element 134, the spin forming tool is free to rotate about its longitudinal axis 172. Once the desired shoulder-bead-groove shape is achieved upon completion of the spin forming process, rotation of housing 158 is halted, the longitudinal axis 172 of the spin forming tool 156 is moved back into alignment with the housing longitudinal axis 160, and the carriage 162 is move away from the die 138, thereby removing the spin forming tool 156 from within pipe element 134. Die 138 is then opened by moving the die sections 140, 142, 144 and 146 apart, thereby allowing removal of the formed pipe element from the die.

It is observed that when spin forming is used to contemporaneously form both the shoulder 22 and bead 26 on opposite sides of the groove 24 as described above, the pipe element material is forced to flow into the area of the pipe element defining the groove such that the groove is formed by the material moving radially inwardly toward the longitudinal axis 182 of the pipe element 134 in the opposite direction to the increasing diameter of the orbit of the spin forming tool 156. The region of the pipe element forming the groove 24 moves away from the die inner surfaces 178 and a gap 184 forms between the groove floor 42 and the inner surfaces 178 of the die 138. The groove floor 42 is smaller in diameter than the die 138 upon completion of the forming process. This motion of the pipe element material contrary to the radially outward motion of the spin forming tool 156 is unexpected, and allows pipe elements 134 to be formed wherein the outer surface 134a of the groove 24 has a diameter 186 less than the diameter 188 of the outer surface of the remainder of the pipe element; i.e., the outer surface 134a of the pipe element exclusive of the groove 24. It was previously thought that such a configuration was possible only with roller forming of the pipe element between two rotating rollers, but spin forming according to the invention allows this configuration to be achieved while maintaining precise and repeatable outer dimensions of the pipe element due to the effect of the fixed die capturing the pipe element. This is unexpected because it was thought that spin forming could only expand a pipe element; i.e., any part of a pipe element deformed by spin forming must have a diameter larger than the original dimension. Therefore, according to the common wisdom, it would not be possible, in a spin forming process, to start with a pipe element having a first outer diameter and end up with a portion of the pipe element having a second outer diameter smaller than the first outer diameter, but applicants have achieved this using spin forming in the method according to their invention.

The pipe element configurations comprising the shoulder, groove and bead, and the methods and apparatus for creating the configurations as shown and described herein allow thin walled pipe elements to be joined by mechanical couplings and used in high pressure/high load applications previously thought unsuited for thin walled pipe elements and grooved mechanical couplings. Various additional advantages over prior art pipe elements are also realized. For example, it is known that the outer diameter 186 of the groove floor 42 is an important dimensional parameter for compatibility between couplings and pipe elements in view of pipe element diameter manufacturing tolerances. The spin forming method disclosed herein permits this parameter to be controlled so that grooves can be formed that are compatible with couplings at both the maximum and minimum pipe diameter tolerances. Furthermore, the combination of the enlarged shoulder diameter 190 (shoulder 22 outwardly facing surface larger than the pipe element outer diameter) and the reduced groove floor diameter (groove floor 42 outer diameter less than the pipe element outer diameter) allows lighter weight couplings to be used without a performance penalty. It is also easier to design the couplings due to the tighter tolerances to which the groove and shoulder dimensions can be held. Practically, this translates into lower cost couplings at lower weight, and stronger joints withstanding higher internal pressures. Gasket design is also simplified because of the tighter tolerances afforded, and it is easier to manage the size of the gap which forms between coupling segments through which the gasket can be extruded and blow-out under high pressures. Manufacturing advantages are also secured as there is less thinning of the pipe element and less cold working required which means lower residual stresses, higher remaining elongations, and stronger pipe elements. The addition of the bead 26 permits a more rigid joint and allows the key to fill the groove and employ a wedging action to advantage. The wedging action holds the pipe elements within the coupling at a constant distance even when under axial compression, due, for example to thermal loads or a vertical pipe stack. This prevents the pipe elements from pinching and damaging the gasket center leg if present. The enlarged shoulder also permits the groove to be relatively shallow and present a lower internal profile within the pipe element. A lower profile groove at each joint causes less head loss and less turbulence in the fluid flowing through the pipe elements. Additionally, by forming the groove concentric with the shoulder a more uniform engagement between the coupling and the pipe elements is achieved, further lessening the likelihood of leaks.

What is claimed is:

1. In combination, a coupling and at least one pipe element, said pipe element having an outer diameter and at least one end, wherein:
   said pipe element comprises:
   a shoulder positioned at said at least one end, said shoulder extending circumferentially around said pipe element and having an outwardly facing surface, said outwardly facing surface having an outer diameter greater than said outer diameter of said pipe element excluding said shoulder;
   a groove positioned adjacent to said shoulder, said groove extending circumferentially around said pipe element, said groove being defined by a first side surface positioned contiguous with said shoulder, a second side surface positioned in spaced apart relation to said first side surface, and a floor surface extending between said first and second side surfaces, said floor surface having an outer diameter less than said outer diameter of said pipe element excluding said groove; said first side surface being oriented substantially perpendicularly to a longitudinal axis of said pipe element; and wherein
   said coupling comprises:
   a plurality of segments attached to one another end to end surrounding a central space, each of said segments having an arcuate surface received within said groove, said arcuate surfaces of each of said segments comprising:
   a first lateral surface in facing relation with said first side surface of said groove;
   a second lateral surface in facing relation with said second side surface of said groove;
   a radial surface in facing relation with said floor surface of said groove; and wherein
   said pipe element further comprises a bead positioned contiguous with said groove, said bead extending circumferentially around and projecting radially outwardly from said pipe element and having an apex with an outer diameter greater than said outer diameter of said pipe element excluding said bead.

2. The combination according to claim 1, wherein said outer diameter of said apex is less than said outer diameter of said outwardly facing surface of said shoulder.

3. The combination according to claim 1, wherein said second side surface is oriented angularly with respect to said longitudinal axis of said pipe element.

4. The combination according to claim 3, wherein said second side surface is oriented at an angle relatively to said longitudinal axis from about 40° to about 70°.

5. The combination according to claim 3, wherein said second side surface is oriented at an angle relatively to said longitudinal axis from about 45° to about 65°.

6. The combination according to claim 3, wherein said second side surface is oriented at an angle relatively to said longitudinal axis of about 55°.

7. The combination according to claim 1, wherein said shoulder further comprises an outwardly facing curved surface positioned contiguous with said first side surface, said outwardly facing curved surface extending circumferentially around said pipe element and having a center of curvature on an axis oriented perpendicularly to a longitudinal axis of said pipe element.

8. The combination according to claim 1, wherein said first lateral surface is oriented substantially perpendicular to a longitudinal axis of said pipe element.

9. The combination according to claim 1, wherein said first lateral surface is oriented angularly relatively to a longitudinal axis of said pipe element.

10. The combination according to claim 9, wherein said first lateral surface has an orientation angle measured relatively to said longitudinal axis from about 80° to about 85°.

11. The combination according to claim 1, wherein said second lateral surface is oriented angularly with respect to said longitudinal axis of said pipe element.

12. The combination according to claim 11, wherein said second lateral surface is oriented at an angle equal to an angle at which said second side surface is oriented with respect to said longitudinal axis of said pipe element.

13. The combination according to claim 11, wherein said second lateral surface of each of said arcuate surfaces is oriented at an angle relatively to said longitudinal axis from about 40° to about 70°.

14. The combination according to claim 11, wherein said second lateral surface of each of said arcuate surfaces is oriented at an angle relatively to said longitudinal axis from about 45° to about 65°.

15. The combination according to claim 11, wherein said second lateral surface of each of said arcuate surfaces is oriented at an angle relatively to said longitudinal axis of about 55°.

16. The combination according to claim 1, wherein said coupling comprises two of said segments, said segments being attached to one another using a hinge.

17. The combination according to claim 1, wherein said coupling comprises two of said segments, said segments being attached to one another end to end using fasteners positioned at opposite ends of said segments.

18. The combination according to claim 1, wherein said first lateral surface is in contact with said first side surface of said groove.

19. The combination according to claim 18, wherein said second lateral surface is in contact with said second side surface of said groove.

* * * * *